(12) United States Patent
Zheng et al.

(10) Patent No.: US 12,086,840 B2
(45) Date of Patent: Sep. 10, 2024

(54) GENERATING PERSONALIZED BANNER IMAGES USING MACHINE LEARNING

(71) Applicant: eBay Inc., San Jose, CA (US)

(72) Inventors: Shuai Zheng, Berkeley, CA (US); Mohammadhadi Kiapour, San Francisco, CA (US); Nandini Ramakrishnan, San Francisco, CA (US); Christophe Boudet, San Francisco, CA (US); Fred Aye Zaw, Jr., Oakland, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/055,273

(22) Filed: Nov. 14, 2022

(65) Prior Publication Data
US 2023/0076209 A1 Mar. 9, 2023

Related U.S. Application Data

(63) Continuation of application No. 17/107,454, filed on Nov. 30, 2020, now Pat. No. 11,507,984, which is a
(Continued)

(51) Int. Cl.
*G06Q 30/00* (2023.01)
*G06F 40/186* (2020.01)
(Continued)

(52) U.S. Cl.
CPC ....... *G06Q 30/0276* (2013.01); *G06F 40/186* (2020.01); *G06N 20/00* (2019.01); *G06Q 30/0277* (2013.01); *G06F 3/04842* (2013.01)

(58) Field of Classification Search
None
See application file for complete search history.

(56) References Cited

U.S. PATENT DOCUMENTS

| | | |
|---|---|---|
| 6,714,975 B1 | 3/2004 | Aggarwal et al. |
| 8,606,645 B1 | 12/2013 | Applefeld |
| (Continued) | | |

FOREIGN PATENT DOCUMENTS

| | | |
|---|---|---|
| CN | 102346899 A | 2/2012 |
| CN | 105956888 A | 9/2016 |
| (Continued) | | |

OTHER PUBLICATIONS

Final Office Action received for U.S. Appl. No. 17/107,454, mailed on Jan. 13, 2022, 26 pages.
(Continued)

*Primary Examiner* — Matthew T Sittner
(74) *Attorney, Agent, or Firm* — FIG. 1 Patents

(57) ABSTRACT

A machine is configured to generate in real time personalized online banner images for users based on data pertaining to user behavior in relation to an image of a product. For example, the machine receives a user selection indicating one or more data features associated with the user. The one or more data features include a data feature pertaining to user behavior in relation to an image of a product. The machine generates, using a machine learning algorithm, a data representation of the machine learning algorithm based on the one or more data features including the data feature pertaining to user behavior in relation to the image of the product. The data representation includes one or more data features pertaining to one or more characteristics of online banner images. The machine generates an online banner image for the user based on the data representation.

20 Claims, 10 Drawing Sheets

Related U.S. Application Data continuation of application No. 16/155,255, filed on Oct. 9, 2018, now Pat. No. 10,885,558.

(51) Int. Cl.
*G06N 20/00* (2019.01)
*G06Q 30/0241* (2023.01)
*G06F 3/04842* (2022.01)

(56) References Cited

U.S. PATENT DOCUMENTS

| | | | |
|---|---|---|---|
| 9,230,266 | B2 | 1/2016 | Bentley |
| 9,892,342 | B2 | 2/2018 | Sandler et al. |
| 10,885,558 | B2 | 1/2021 | Zheng et al. |
| 2002/0103704 | A1 | 8/2002 | Amano et al. |
| 2002/0196274 | A1 | 12/2002 | Comfort et al. |
| 2006/0085251 | A1* | 4/2006 | Greene ............... G06Q 30/0255 705/14.53 |
| 2007/0073641 | A1* | 3/2007 | Perry .................... G06F 16/335 |
| 2007/0220045 | A1 | 9/2007 | Morris et al. |
| 2011/0066497 | A1 | 3/2011 | Gopinath et al. |
| 2011/0307319 | A1 | 12/2011 | Balestrieri et al. |
| 2013/0191219 | A1* | 7/2013 | SanGiovanni ............ G06T 3/40 726/28 |
| 2014/0200996 | A1 | 7/2014 | Hotta |
| 2014/0344727 | A1* | 11/2014 | Chaudhry ........... H04L 43/0876 715/760 |
| 2015/0286898 | A1 | 10/2015 | Di et al. |
| 2016/0162779 | A1* | 6/2016 | Marcus .................. G06N 20/10 706/12 |
| 2017/0091627 | A1* | 3/2017 | Terrazas .................. G06F 16/29 |
| 2017/0091629 | A1 | 3/2017 | Li et al. |
| 2017/0251081 | A1* | 8/2017 | Roychowdhury .......................... G06Q 30/0277 |
| 2017/0287023 | A1 | 10/2017 | Koch et al. |
| 2018/0005140 | A1* | 1/2018 | Chittilappilly ......... G06N 20/00 |
| 2018/0095631 | A1* | 4/2018 | Muta ...................... G06F 3/0416 |
| 2018/0137542 | A1* | 5/2018 | Pesavento .......... G06Q 30/0276 |
| 2018/0144256 | A1 | 5/2018 | Saxena et al. |
| 2018/0181592 | A1* | 6/2018 | Chen ........................ G06N 3/08 |
| 2018/0189260 | A1 | 7/2018 | Kannan et al. |
| 2018/0197223 | A1 | 7/2018 | Grossman |
| 2018/0349506 | A1* | 12/2018 | Kirk .................... G06F 16/9577 |
| 2019/0259058 | A1 | 8/2019 | Abir |
| 2019/0364027 | A1 | 11/2019 | Pande et al. |
| 2020/0111134 | A1 | 4/2020 | Zheng et al. |
| 2021/0103957 | A1 | 4/2021 | Zheng et al. |

FOREIGN PATENT DOCUMENTS

| | | |
|---|---|---|
| CN | 108021417 A | 5/2018 |
| CN | 106164837 A | 1/2024 |
| JP | 2010061254 A | 3/2010 |
| KR | 20010044162 A | 6/2001 |
| KR | 20010109746 A | 12/2001 |
| KR | 10200010109746 A | 12/2001 |
| KR | 100415852 B1 | 1/2004 |
| KR | 20080104246 A | 12/2008 |
| KR | 10200080104246 A | 12/2008 |
| KR | 20180065959 A | 6/2018 |
| KR | 1020180065959 A | 6/2018 |
| WO | 2020/076518 A1 | 4/2020 |

OTHER PUBLICATIONS

International Search Report and Written Opinion of the International Searching Authority, issued in connection with Int'l Appl. No. PCT/US2019/053363, dated Oct. 12, 2019 (8 pages).
IP.com Search Strategy dated Aug. 24, 2021 (Year: 2021), 2 pages.
Non-Final Office Action received for U.S. Appl. No. 17/107,454, mailed on Apr. 14, 2022, 19 pages.
Non-Final Office Action received for U.S. Appl. No. 17/107.454, mailed on Aug. 27, 2021, 30 pages.
Non-Final Office Action Received for U.S. Appl. No. 16/155,255, malled on Apr. 3, 2020, 23 pages.
Notice of Allowance received for U.S. Appl. No. 17/107,454, mailed on Jul. 20, 2022, 17 pages.
Notice of Allowance received for U.S. Appl. No. 16/155,255, mailed on, Sep. 1, 2020, 12 Pages.
Office Action Received for Korean Patent Application No. 10-2021-7010405, mailed on Dec. 21, 2022, 10 pages (2 pages of English translation & 8 pages of official copy).
STIC EIC 3600 Search Report for U.S. Appl. No. 16/155,255, Apr. 22, 2020, 20 pages.
STIC EIC 3600 Search Report for U.S. Appl. No. 17/107,454, Aug. 26, 2021, 9 pages.
Xu, "AI Visual Design Is Already Here—And It Won't Hesitate To Take Over Your Petty Design Job", Retrieved from he Internet URL: https://medium.com/@rexrothX/ai-visual-design-is-already-here-and-it-wont-hesitate-to-take-over-your-petty-design-job-934d756db82e, Nov. 16, 2017, 7 pages.
2021-7010405 , "Final Office Action", KR Application No. 2021-7010405, Jun. 29, 2023, 8 Pages.
2021-7010405 , "Foreign Office Action", KR Application No. 2021-7010405, Nov. 29, 2023, 4 pages.
201980066520.3 , "Foreign Office Action", CN Application No. 201980066520.3, Jan. 8, 2024, 10 pages.
201980066520.3 , "Foreign Office Action", CN Application 201980066520.3, Jun. 3, 2024, 15 pages.

* cited by examiner

600 ⤵

602
Determine a first mapping of memory addresses to a first subset of multiple slices in a shared cache level, the first subset of multiple slices being closest to a first processor on which a thread is running that accesses the memory addresses

604
Determine a second mapping of the memory addresses to the multiple slices in the shared cache level

606
Assign the memory addresses to the first mapping in response to a determination that the memory addresses are assigned to a selectable range of memory addresses

GENERATING PERSONALIZED BANNER IMAGES USING MACHINE LEARNING

RELATED APPLICATIONS

This application is a continuation of U.S. Patent Application Ser. No. 17/107,454 filed Nov. 30, 2020, entitled "GENERATING PERSONALIZED BANNER IMAGES USING MACHINE LEARNING", now U.S. Pat. No. 11,507,984, issued Nov. 22, 2022, which is a continuation of U.S. patent application Ser. No. 16/155,255, filed Oct. 9, 2018, entitled "GENERATING PERSONALIZED BANNER IMAGES USING MACHINE LEARNING", now U.S. Pat. No. 10,885,558, issued Jan. 5, 2021; each of which is hereby incorporated by reference in its entirety.

TECHNICAL FIELD

Embodiments of the present disclosure relate generally to generating personalized banner images using machine learning, and, more particularly, but not by way of limitation, to generating an enhanced user interface for displaying an online banner image that is personalized to appeal to a particular user.

BACKGROUND

Currently, online advertising (e.g., an online banner image, or simply "online banner") is generated for display to a user based on a prior search by the user using some search words. Such online advertising may include a stock image of a product that represents results of the search performed using the search words. A stock image of a product may not accurately represent the product in which the user is interested, and therefore may not capture the user's attention, and may not result in an intended result (e.g., a click on the online advertising, or a purchase of the displayed product). In addition, the banner images are often pre-defined and generated in advance, and by the time the online banners are shown to users they are not relevant to the users anymore.

BRIEF DESCRIPTION OF THE DRAWINGS

Various ones of the appended drawings merely illustrate example embodiments of the present disclosure and cannot be considered as limiting its scope.

FIG. 6 is a flow diagram illustrating a method for generating personalized banner images using machine learning, and representing an additional step of the method illustrated in FIG. 5, according to some example embodiments.

Figure 1:
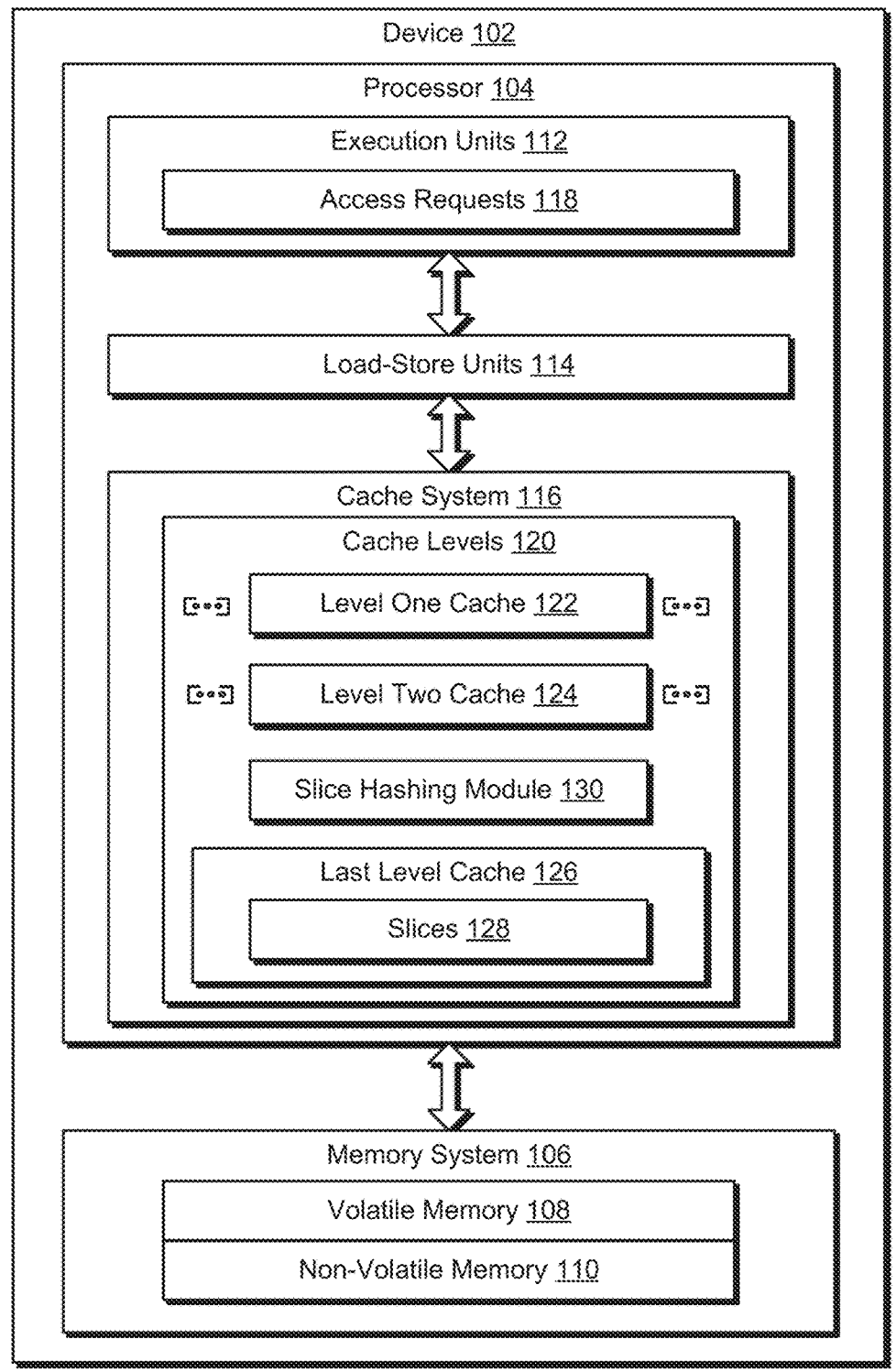
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A machine learning system may facilitate the generation, using machine-learning algorithms, of online banners based on actual images (e.g., photographs) extracted from product listings available on a website (e.g., the website of an online store or online marketplace). The images correspond to products at which the user looked previously, for instance, in a prior visit to the website. The user may have searched for these products or may have clicked on information associated with these products displayed to the user while navigating the website.

In addition to the online banners including images from listings of actual products available for purchase, the online banners are generated to aesthetically appeal to particular users or to groups of users based on continuous machine learning of what types of online banners are selected by various users. For example, an online banner that includes particular structural elements (e.g., a green rectangle online banner divided vertically into three equal portions where the left portion includes text, and the middle and right portions each includes an image of a particular product) may be displayed to a number of users and may be determined to be more appealing to a certain demographic. Certain features of the online banner may be iteratively modified in next versions of the online banner displayed to the users in order to continue to learn about the user response to various feature combinations associated with the online banners.

The continuous learning allows the machine-learning system to iteratively update data representations (e.g., embeddings) of the machine-learning system associated with the users in order to achieve a better understanding of the users' likes and dislikes with respect to the various aspects of the online banners. As a result, the machine-learning system generates highly-customized online banners that appeal to (e.g., are highly selectable by) groups of users or particular users.

For example, A/B tests are utilized to collect user data pertaining to the online banners (e.g., click or lack of a click on a particular online banner, or conversion rate for the products displayed in product images included in the online banners). Based on the user data (e.g., user feedback on online banner design choices), the machine learning system, using one or more reinforcement learning algorithms, iteratively modifies various aspects of the online banner images in order to optimize the banner advertisement click rate and conversion rate.

In some example embodiments, based on determining that some online banners are being selected (e.g., clicked on), the machine learning system learns not only about users in general but also about particular users. In the next iteration (e.g., next online banner shown to a user), the machine learning system modifies one feature of the online banner previously shown to the user to determine whether the user clicks on the modified online banner or not. That is helpful in understanding where the user's preference is with respect to the modified feature of the banner. This learning facilitates increased level of customization of online banners to users' specific preferences regarding product images and esthetic qualities of online banners.

In some example embodiments, the machine learning system identifies the online banners that are more successful by ranking the online banners based on the number of times the respective online banners were selected by users. The combinations of features associated with the more successful online banners are associated with certain weight values based on the ranking of the online banners. The machine learning system also analyzes the combinations of features of the more successful online banners to determine whether some online banners appeal to certain groups of people grouped demographically, geographically, by professions, by neighborhood culture, etc. The machine learning system may segment a user population in a variety of ways to learn what feature combinations appeal to various segments of the user population.

Generally, web sites that publish digital content pertaining to items of interest to the public present such digital content only as listings that include various information about the items. An example of such digital content is a listing published on behalf of a seller of a product. A user interface of a client device presents listings of products that may include one or more photographs of the product and a description of one or more attributes of the product.

Conventional user interfaces have many deficits relating to the efficient functioning of the computer, requiring a user of a conventional user interface to scroll around and switch views many times to find the right data associated with an item, especially when the conventional user interface is displayed on a small screen. Because small screens tend to need data and functionality divided into many layers or views, conventional user interfaces require users to drill down through many layers to get to desired data or functionality. That process could seem slow, complex, and difficult to learn, particularly to novice users. Further, that process decreases data processing speeds, and is often associated with higher data storage requirements.

In some example embodiments, a machine learning system that provides iteratively updated online banners displayed via a user interface improves conventional user interfaces by presenting the information pertaining to the items illustrated in the item images included in the online banners in a particular way in electronic devices that results in the delivery of exact information pertaining to a particular item of actual interest to the user at the time a visualization of the online banner is presented to the user. The improved functionality of the user interface of the electronic device also enhances the efficiency of the electronic devices by improving data processing speeds and data storage efficiency.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. FIG. 1 illustrates, for example, a web client 112 (e.g., a browser, such as the Internet Explore® browser developed by Microsoft™ Corporation of Redmond, Washington State), a client application 114, and a programmatic client 116 executing on client device 110.

The client device 110 may comprise, but is not limited to, mobile phones, desktop computers, laptops, portable digital assistants (PDAs), smart phones, tablets, ultra books, netbooks, multi-processor systems, microprocessor-based or programmable consumer electronics, game consoles, set-top boxes, wearable devices, smart watches, or any other communication devices that a user may utilize to access the networked system 102. In some embodiments, the client device 110 may comprise a display module to display information (e.g., in the form of user interfaces). In further embodiments, the client device 110 comprises one or more of a touch screens, accelerometers, gyroscopes, cameras, microphones, global positioning system (GPS) devices, and so forth. The client device 110 is a device of a user that can be used to perform a transaction involving digital items within the networked system 102. In some example embodiments, the networked system 102 comprises a network-based marketplace (also referred to as "online marketplace") that responds to requests for product listings, publishes publications comprising item listings of products or services available on the network-based marketplace, and manages payments for these marketplace transactions. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., to access to a database of items available for sale, to authenticate a user, to verify a method of payment, etc.). Conversely, if the e-commerce site application is not included in the client device 110, the client device 110 uses its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host a machine learning system 400 and a payment system 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or databases 126. In an example embodiment, the databases 126 are storage devices that store information (e.g., publications, listings, digital content items, product descriptions, images of products, etc.) to be utilized by the machine learning system 400. The databases 126 may also store digital item information, in accordance with example embodiments.

Additionally, a third party application 132, executing on one or more third party servers 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The machine learning system 400 provides a number of publication functions and services to users 1.06 that access the networked system 102. For example, the machine learning system 400 facilitates the generation and online publishing of a customized banner image for a particular user based on one or more data features associated with the particular user. The one or more data features include a data feature pertaining to user behavior in relation to an image of a product. The payment system 144 provides a number of functions to perform or facilitate payments and transactions. While the machine learning system 400 and payment system 144 are shown in FIG. 1 to both form part of the networked system 102, it will be appreciated that, in alternative embodiments, each of the machine learning system 400 and payment system 144 may form part of a service that is separate and distinct from the networked system 102. In some embodiments, the payment system 144 may form part of the machine learning system 400.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The machine learning system 400 and payment system 144 could also be implemented as stand-alone software programs, which do not necessarily have networking capabilities.

The web client 112 accesses the machine learning system 400 or the payment system 144 via the web interface supported by the web server 122. Similarly, the programmatic client 116 accesses the various services and functions provided by the machine learning system 400 or the payment system 144 via the programmatic interface provided by the API server 120. The programmatic client 116 may, for example, be a seller application (e.g., the Turbo Lister application developed by eBay' Inc., of San Jose, California) to enable sellers to author and manage listings on the networked system 102 in an off-line manner, and to perform batch-mode communications between the programmatic client 116 and the networked system 102.

Figure 2:
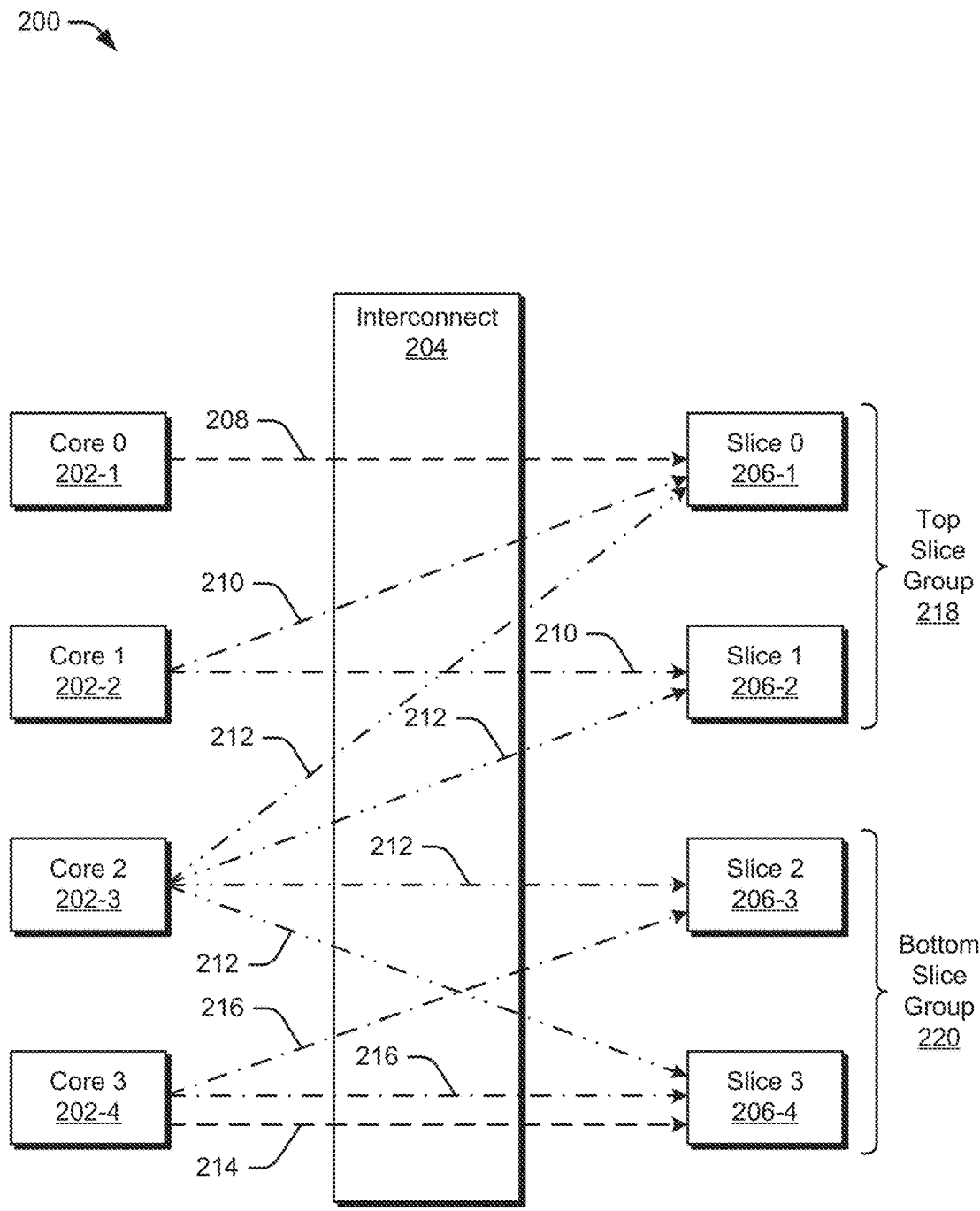
FIG. 2 illustrates the training and use of a machine-learning program, according to some example embodiments.

FIG. 2 illustrates the training and use of a machine-learning program, according to some example embodiments. In some example embodiments, machine-learning programs (MLP), also referred to as machine-learning algorithms or tools, are utilized to perform operations associated with searches, such as digital content (e.g., an image, a product description, or a listing) searches, and optimization operations.

Machine learning is a field of study that gives computers the ability to learn without being explicitly programmed. Machine learning explores the study and construction of algorithms (also referred to herein as "tools") that learns from existing data and makes predictions about new data. Such machine-learning tools operate by building a model from example training data 212 in order to make data-driven predictions or decisions expressed as outputs or assessments 220. Although example embodiments are presented with respect to a few machine-learning tools, the principles presented herein may be applied to other machine-learning tools.

In some example embodiments, different machine-learning tools are used. For example, Logistic Regression (LR), Naive-Bayes, Random Forest (RF), neural networks (NN), matrix factorization, and Support Vector Machines (SVM) tools may be used for generating online banner images that are optimized to appeal to particular users.

In general, there are two types of problems in machine learning: classification problems and regression problems. Classification problems, also referred to as categorization problems, aim at classifying items into one of several category values (e.g., is this object an apple or an orange?). Regression algorithms aim at quantifying some items (e.g., by providing a value that is a real number). In some embodiments, example machine-learning algorithms provide a score (e.g., a number from 1 to 100) to qualify one or more products as a match for a user of the online marketplace.

In certain example embodiments, the machine-learning algorithms utilize the training data 212 to find correlations among identified features 202 (or combinations of features 202) that affect the outcome. In some example embodiments, example machine-learning algorithms are used to determine what colors to use in an online banner image, what color combinations appeal to users, what proportions (e.g., measurements or ratios) associated with the different sections included in the online banner image appeal to users, what type, size, color, and font of text users respond to, and what various features associated with product images elicit desired responses from users (e.g., purchases of products, or selection of online banner images). Random combinations of features (e.g., one overall color of the online banner image or not, the number of portions in the online banner image, color of each portion in the online banner image, number of different products in the online banner image, if only one product is used—the number of times a product image appears in the online banner image, where in the online banner image the product image appears, or various text-related features) are used as training data 212. A machine-learning program executes to generate a number of online banner images using the various combinations of features. In some example embodiments, an administrator of the machine learning system 400 determines which of the various combinations of features are great (e.g., lead to desired results), and which ones are not. The combinations of features determined to be (e.g., classified as) successful are input into a machine learning algorithm for the machine learning algorithm to learn which combinations of features (also referred to as "patterns") are "good" (e.g., a user will select the online banner image), and which patterns are "bad."

The interactions by users with various online banners provide another feature for the machine learning algorithm to add to the identified features 202, and use in learning which banner patterns are preferred by users—which color pattern/combination are preferred; whether users prefer online banners that include more than one product images preferred to online banners that includes only one product image; whether users prefer to see a lot of one color (e.g., pink) in the online banner; whether users prefer online banners without a product image, etc. The machine learning system then starts to generate thousands and thousands of banners for the same combination of features, and based on the continuous learning picks the best banners to show to users at particular times based on the learning performed up to that point.

The machine-learning algorithms utilize features for analyzing the data to generate assessments 220. A feature 202 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In some example embodiments, the features 202 may be of different types and include one or more of user features 204, item features 206, preference features 208, and online banner features 210. The user features 204 includes one or more features, such as a user identifier (e.g., a name or a login), whether the user is a buyer or a seller, or both, a gender of the user, a location of the user, a language of the user, data pertaining to one or more purchases by the user, identifiers of items watched by the user on the online marketplace, identifiers of liked items on the online marketplace, items placed into an online cart of the online marketplace, etc.

The item features 206 includes any data related to an item, such as a product available for sale on the online marketplace. Example of item features 206 are an item identifier (e.g., a product identifier, such as a stock keeping unit (SKU)), a type of item, a brand of the item, a size of the item, a color of the item, an image of the item, etc.

The preference features 208 include any data related to the preferences of a user, such as express preferences provided by the user, or implied or derived preferences of the user (e.g., preferences of the user extracted from recommendations provided by the user to other users).

The online banner features 210 include a template data feature that identifies a template for generating an online banner image, a frequency feature that identifies how frequently the online banner image should be presented to the user, a result feature that indicates whether a certain online banner image is associated with a desired result (e.g., an interaction by the user with the online banner image).

The machine-learning algorithms utilize the training data 212 to find correlations among the identified features 202 that affect the outcome or assessment 220. In some example embodiments, the training data 212 includes known data for one or more identified features 202 and one or more outcomes, such as combinations of features in an online banner image which lead to users selecting the online banner image, combinations of features in an online banner image which lead to users purchasing the product displayed in a product image included in the online banner image, etc.

With the training data 212 and the identified features 202, the machine-learning tool is trained at operation 214. The machine-learning tool appraises the value of the features 202 as they correlate to the training data 212. The result of the training is the trained machine-learning program 216.

When the machine-learning program 216 is used to perform an assessment, new data 218 is provided as an input to the trained machine-learning program 216, and the machine-learning program 216 generates the assessment 220 as output. For example, when a user selects a particular online banner image displayed for the user in a user interface of a client device of the user, a machine-learning program, trained with various combinations of features used to generate various online banner images, updates the features 202 with one or more additional features (e.g., a feature that indicates that the user selected the particular online banner image) which will be used in further training of the machine-learning program, and in the generating of future personalized online banner images for the particular user and possibly other users.

Figure 3:
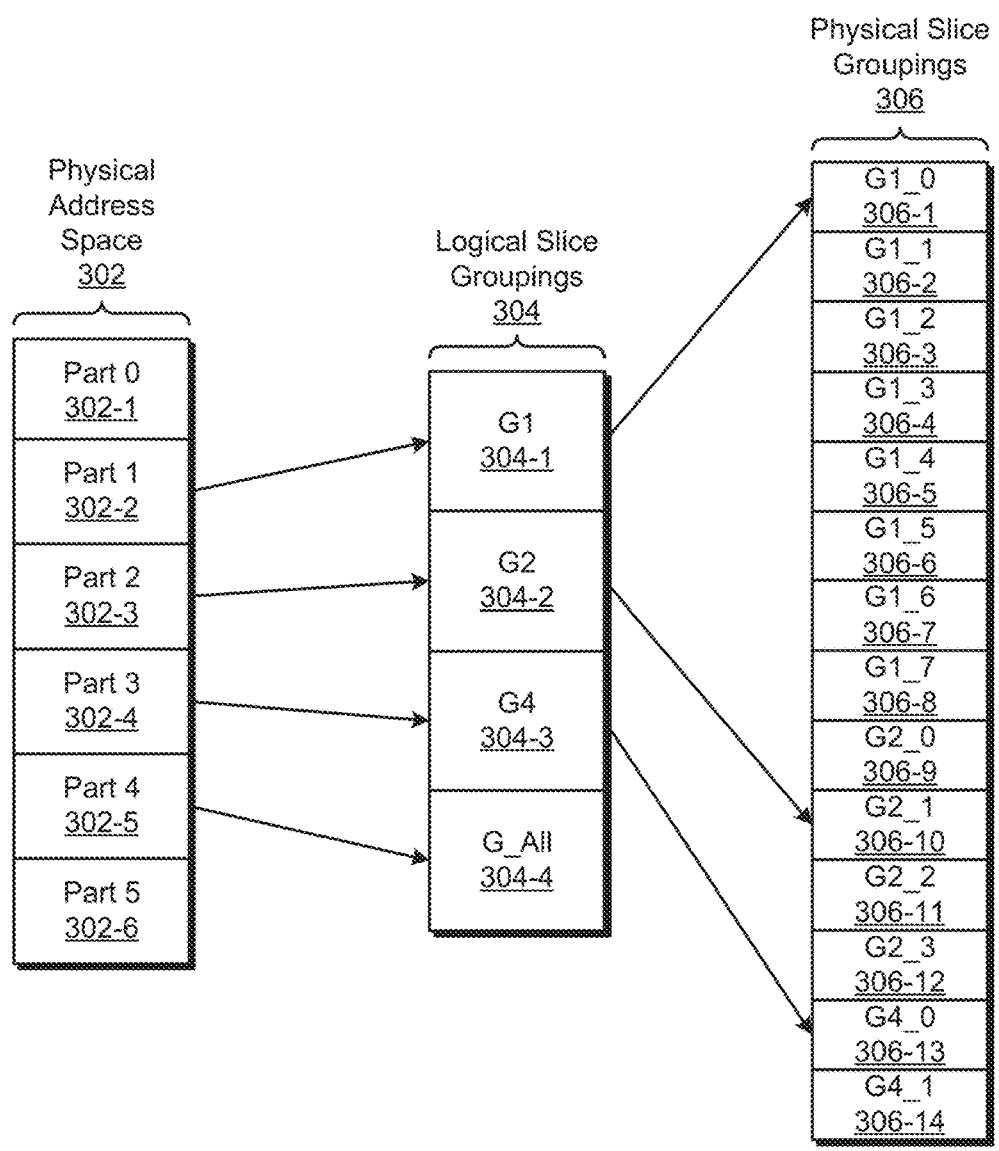
FIG. 3 illustrates a user interface displaying an online personalized banner image, according to some example embodiments.

FIG. 3 illustrates a user interface 300 that is improved by displaying a selectable personalized online banner image 310 to a user of a client device, according to various example embodiments. The online banner image 310 includes one or more sections (e.g., section 312, section 314, or section 316). The online banner image 310 may be divided into horizontal sections, vertical sections, or a combination thereof. In some example embodiments, each section of the online banner image 310 has the same background color. In some example embodiments, the background colors of the various sections are different. In various example embodiments, the background colors of the various sections are shades of the same color.

One or more sections of the online banner image 310 include text. As shown in FIG. 3, section 312 of the online banner image 310 includes text 318. The placement of the text, the type and size of the font associated with the text may be different, according to various example embodiments.

One or more sections of the online banner image 310 include one or more images of one or more items. As shown in FIG. 3, section 314 includes image 320, and section 312 includes image 322. The one or more items, in some instances, are products available for sale on an online marketplace. In some example embodiments, the one or more images are product images previously viewed by the user. A product image previously viewed by the user may be included in the online banner image to personalize the online banner image to an interest recently manifested (e.g., expressed or displayed) by the user while browsing a website of the online marketplace.

In some example embodiments, image 320 and image 322 are the same exact image of a particular product (e.g., the images are repeated in the online banner image 310). In certain example embodiments, image 320 and image 322 are two different images of a particular product (e.g., the images display different perspectives of the particular product in the online banner image 310). In various example embodiments, image 320 and image 322 are images of two different products of a particular type (e.g., image 320 illustrates a first type of shoe, and image 322 illustrates a second type of shoe). In some example embodiments, image 320 and image 322 are images of two different products of two different types, where the types of product belong to the same category, such as a particular sport (e.g., image 320 illustrates a hockey stick, and image 322 illustrates a hockey puck). In various example embodiments, image 320 and image 322 are images of two different products of two different types, where the types of product belong to different categories of products (e.g., image 320 illustrates a hockey stick, and image 322 illustrates a sculpture).

The user interface 300 may display additional information, such as content item 318 or content item 320. In some example embodiments, the additional information includes information pertaining to one or more products available for sale on the online marketplace.

In various example embodiments, the user selects the online banner image 310 (e.g., one or more portions of the online banner image 310). A selection of the online banner image 310 results in the causing of display of additional information pertaining to the product illustrated in one of the images 320 or 322. For example, the machine learning system generates a personalized online banner 310 to include images 320 or 322 that illustrate a particular antique chair that the user previously viewed on the online marketplace. The user selects one of the images 320 or 322 included in the online banner image 31.0. Based on the user selection of one of the images 320 or 322, the machine learning system accesses a product listing associated with the particular antique chair, and causes display of the product listing as content item 318 in the user interface 300. The product listing may include one or more of the images 320 and 322, and a description of one or more attributes of the product.

In some example embodiments, the online banner image 310 is caused to display in a physical billboard (e.g., a billboard that displays information on the side of a road), an electronic billboard (e.g., a billboard that displays information via a user interface of a client device), or an electronic physical billboard (e.g., an electronic billboard located in a public place, that allows a user to interact with one or more parts of the electronic billboard to obtain additional information pertaining to the data displayed on the electronic billboard). In various example embodiments, the information displayed via such billboards is customized to a market or population of a particular geographic area (e.g., a city, a state, or a country).

Figure 4:
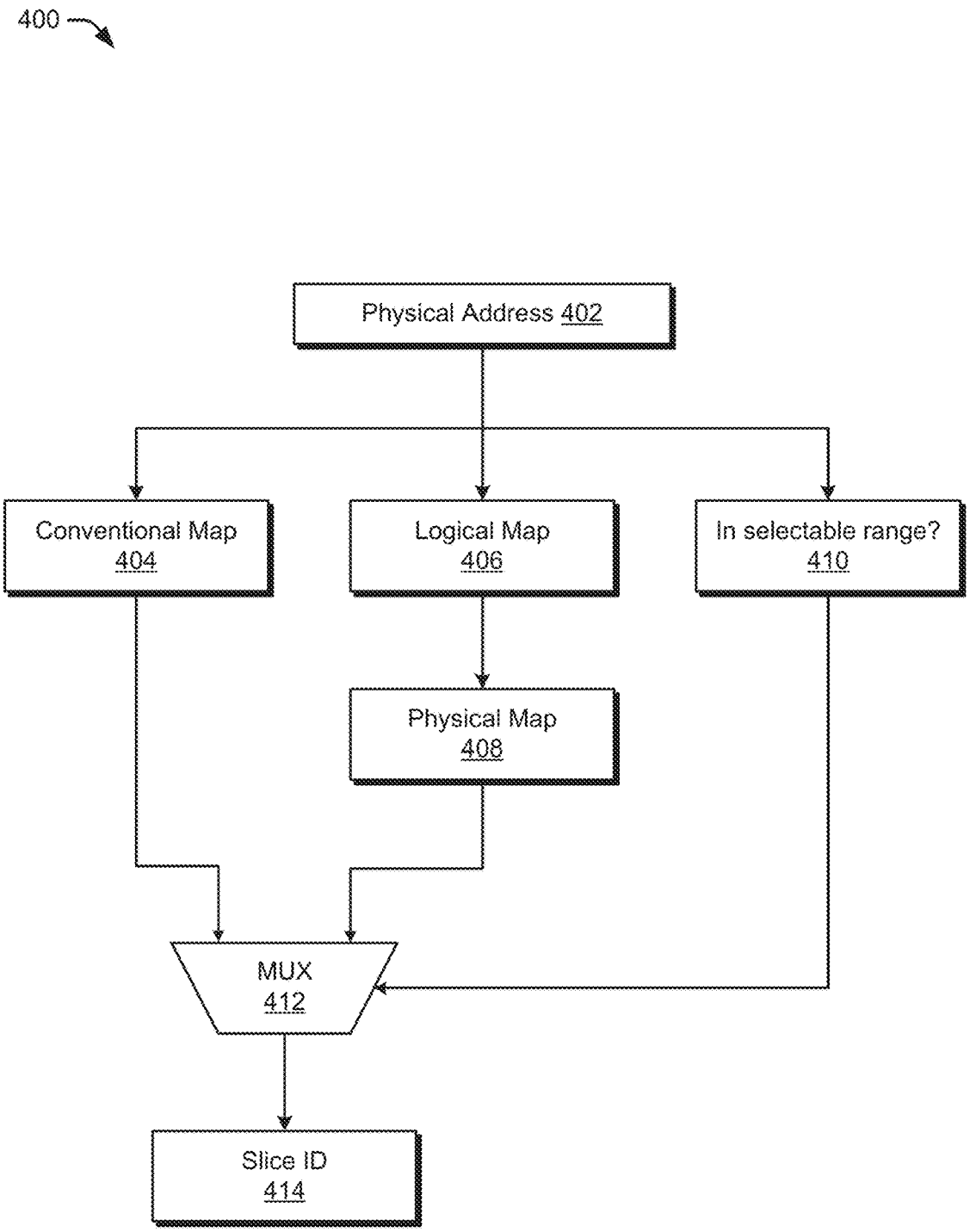
FIG. 4 is a block diagram illustrating components of a machine learning system, according to some example embodiments.

FIG. 4 is a block diagram illustrating components of the machine learning system 400, according to some example embodiments. As shown in FIG. 4, the machine learning system 400 includes an access module 402, a data representation generating module 404, a banner image generating module 406, and a user interface module 408, all configured to communicate with each other (e.g., via a bus, shared memory, or a switch).

According to some example embodiments, the access module 402 receives a user selection indicating one or more data features associated with the user. The one or more data features include a data feature pertaining to user behavior in relation to an image of a product.

The data representation generating module 404 generates, using a machine learning algorithm, a data representation of the machine learning algorithm. The generating of the data representation is based on the one or more data features including the data feature pertaining to user behavior in relation to the image of the product. The data representation includes one or more data features pertaining to one or more characteristics of online banner images. The data representation may be stored in a record of database.

The banner image generating module 406 generates an online banner image for the user based on the data representation. In some example embodiments, one or more of the features 202 of FIG. 2 are included in the data representation, and provide (e.g., represent or indicate) information used by the banner image generating module 406 in generating the online banner image. In some example embodiments, the banner image generating module 406 utilizes computer vision techniques. In various example embodiments, the generated online banner image includes one or more sections, as shown in FIG. 3.

The user interface module 408 causes display of the online banner image in a user interface of a client device associated with the user. In some example embodiments, the user interface module 408 causes display of the online banner image in an electronic physical billboard, such as a billboard displayed at a bus station, a conference, in the lobby of a building, in a store, or in other public places. The online banner image caused to be displayed in the electronic physical billboard may include one or more sections, as described in FIG. 3. The electronic physical billboard may provide the online banner image in a user interface of the electronic physical billboard to allow a user to select one or more elements of the user interface, or the one or more sections of the online banner image. The one or more items included in images displayed in the online banner image caused to be displayed in the electronic physical billboard are, in some instances, items of interest to segment of population associated with (e.g., living in, working in, or visiting) the neighborhood where the electronic physical billboard is located.

To perform one or more of its functionalities, the machine learning system 400 communicates with one or more other systems. For example, an integration engine (not shown) may integrate the machine learning system 400 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources to allow information to be passed between the applications and to allow the applications to share and access common data. Furthermore, the modules may access one or more of the databases 226.

Figure 5:
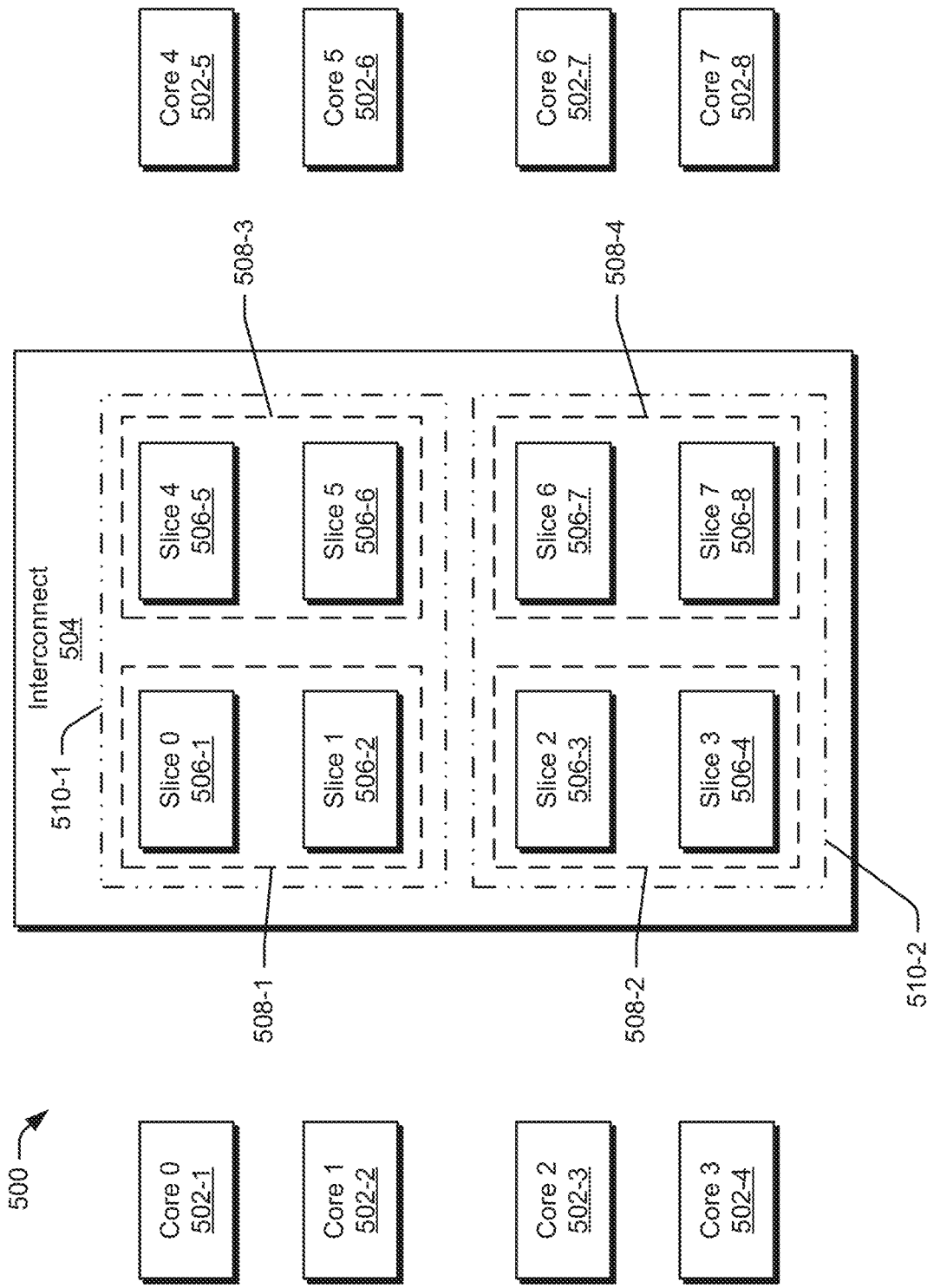
FIG. 5 is a flow diagram illustrating a method for generating personalized banner images using machine learning, according to some example embodiments.

FIGS. 5-8 are flowcharts illustrating a method for generating personalized banner images using machine learning, according to some example embodiments. Operations in the method 500 illustrated in FIG. 5 may be performed using modules described above with respect to FIG. 4. As shown in FIG. 5, method 500 may include one or more of method operations 502, 504, and 506, according to example embodiments.

At operation 502, the access module 402 receives a user selection indicating one or more data features associated with the user. The one or more data features include a data feature pertaining to user behavior in relation to an image of a product. In some example embodiments, the user selection includes a selection of an image of an item on a website (e.g., a product image of a product available for purchase on an online marketplace).

At operation 504, the data representation generating module 404 generates, using a machine learning algorithm, a data representation of the machine learning algorithm. The generating of the data representation is based on the one or more data features including the data feature pertaining to user behavior in relation to the image of the product. The data representation includes one or more data features pertaining to one or more characteristics of online banner images.

In some example embodiments, the data representation of the machine learning algorithm is a vector of data features. The vector includes the one or more data features associated with the user. The vector further includes one or more data features associated with a look-and-feel of the online banner image. The look-and-feel of the online banner image is, in some instances, specified by a template data feature that represents one or more structural elements of the online banner image. Examples of structural elements of the online banner image are an identifier of the number of sections of the online banner image, an indication of the location of the various sections within the online banner image, identifiers of background colors of the various sections of the online banner image, an identifier of a particular product image associated with a product, such as a product available for purchase on the online marketplace, text to be included in the online banner image, etc.

At operation 506, the banner image generating module 406 generates an online banner image for the user based on the data representation. The online banner image may be presented to a user via a user interface of a client device of the user. An example online banner image is shown in FIG. 3 above.

In some example embodiments, the machine learning system 400 leverages natural language processing and computer vision technologies to generate an online banner image for the user in real time based on a prior search (e.g., a search for data pertaining to a product) by the user at the online marketplace website.

In various example embodiments, the online banner image, in some example embodiments, is caused to display in a particular (e.g., a first) area of the user interface. Additional information may be presented to the user in other (e.g., a second or a third) areas of the user interface.

In some example embodiments, the online banner image includes a product image that is selectable via the user interface. In some instances, a selection, via the user interface, of the product image results in causing display, in the user interface, of a product listing associated with a product depicted in the product image. The product listing is selectable via the user interface. In response to the user selecting the product listing, the user interface module 408 accesses data associated with the product listing from a record of a database, and causes display of the data associated with the product listing in the user interface (e.g., in a second area of the user interface) of the client device. In some instances, the product information is caused to be displayed such that the product information replaces the online banner image in the user interface. In some instances, the product information is caused to be displayed such that the product information is displayed together with the online banner image in the user interface. For example, the online banner image is displayed in a first area of the user interface, while the product information is displayed in a second area of the user interface.

In some example embodiments, the one or more data features include a feature indicating a product previously searched by the user. For example, during a first user session on an online marketplace, the user logs in and browses a number of web pages associated with one or more products available for purchase via the online marketplace. The user may spend a time that exceeds a particular threshold value viewing a particular product (e.g., a pair of shoes, a vase, or a piece of art). Next time the user logs into the website associated with the online marketplace, the machine learning system 400 generates and causes to be displayed in the user interface an online banner image that includes the actual one or more images of the particular product that the user viewed in the prior user session at the online marketplace.

Further details with respect to the method operations of the method 500 are described below with respect to FIGS. 6-8.

As shown in FIG. 6, method 500 includes operation 602, according to some embodiments. Operation 602 may be performed after operation 506, in which the user interface module 330 causes display of the online banner image in a user interface of a client device associated with the user.

In some example embodiments, the online banner image is caused to be displayed in the user interface of the client device based on receiving one or more login credentials from the client device.

The causing display of the online banner image enhances the user interface on the client device by presenting a selectable online banner image in the user interface. The user may select (e.g., click on) any portion of the online banner image, and may be shown information pertaining to a product illustrated in the product image included in the selected online banner image. In some example embodiments, the machine learning system 400 causes display of a listing of the product illustrated in the product image included in the selected online banner image.

Figure 7:
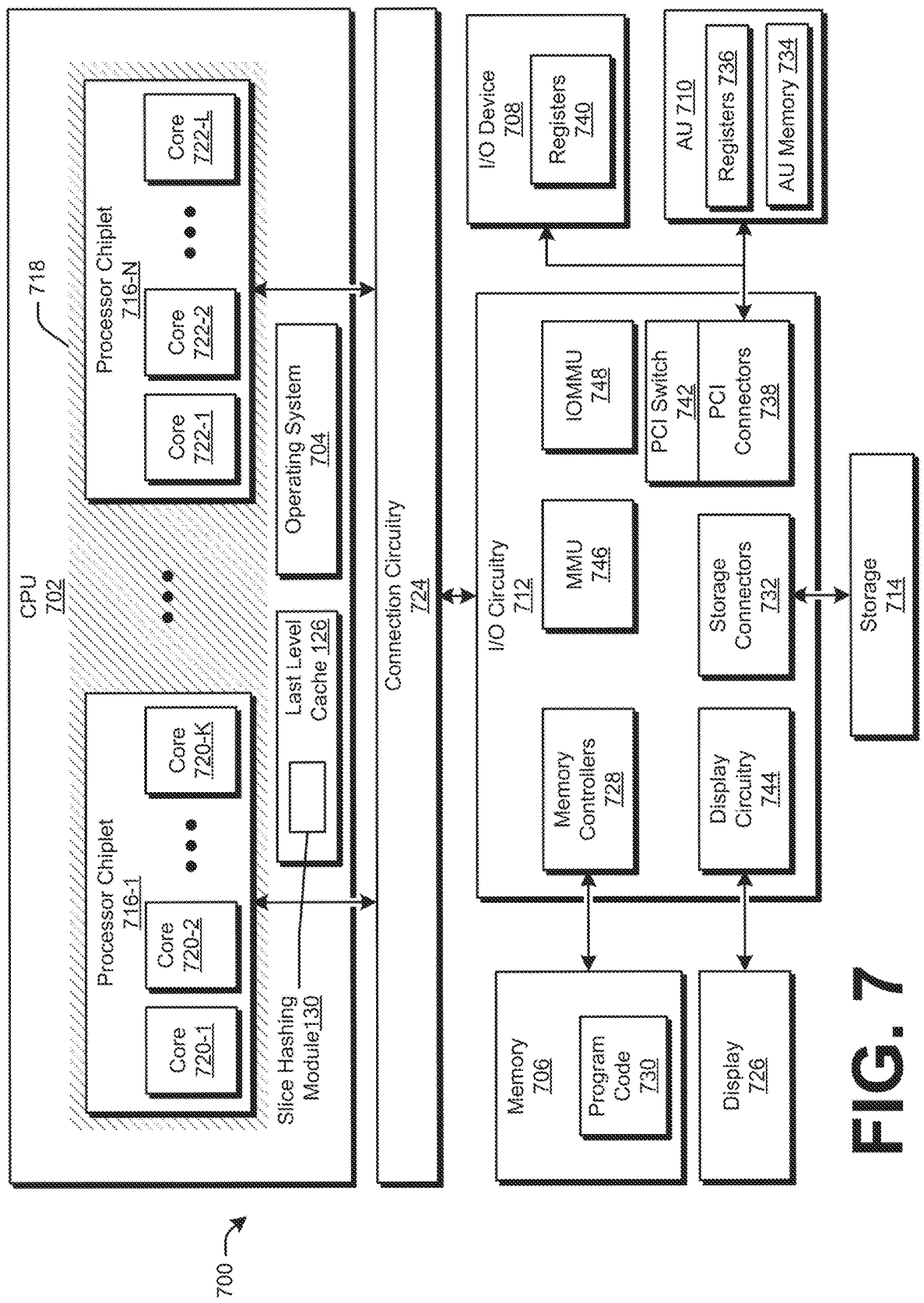
FIG. 7 is a flow diagram illustrating a method for generating personalized banner images using machine learning, and representing additional steps of the method illustrated in FIG. 6, according to some example embodiments.

As shown in FIG. 7, method 500 includes operations 702, 704, and 706, according to some embodiments. Operation 702 is performed after operation 602 of FIG. 6, in which the user interface module 330 causes display of the online banner image in a user interface of a client device associated with the user.

At operation 702, the access module 402 receives, from the client device, an indication of an input. In some example embodiments, the input is a selection, by the user, of the online banner image displayed in the user interface of the client device associated with the user.

At operation 704, the data representation generating module 404 updates the data representation of the machine learning algorithm. In some example embodiments, the updating of the data representation is based on adding an additional feature that indicates the input. In various example embodiments, the updating of the data representation is based on changing an existing feature included in the data representation in order to indicate the input received from the client device.

At operation 706, the banner image generating module 406 updates the online banner image for the user based on the updated data representation. In some example embodiments, the updating of the online banner image includes generating a further online banner image for the user to reflect additional information pertaining to the user (e.g., an additional action by the user, or an additional preference expressed by the user or derived based on data pertaining to the user).

In some example embodiments, the indication of an input includes an indication of a lack of selection by a user of the online banner. For example, an online banner is generated to include one or more product images that are of low quality (e.g., the lighting is poor). The images are associated with a particular seller identifier of a seller. Because the machine learning system receives an indication of a lack of selection of the online banner, the machine learning algorithm will not select images associated with the seller identifier after a round of presentation of online banners and not reaching the desired result (e.g., clicks from users).

Figure 8:
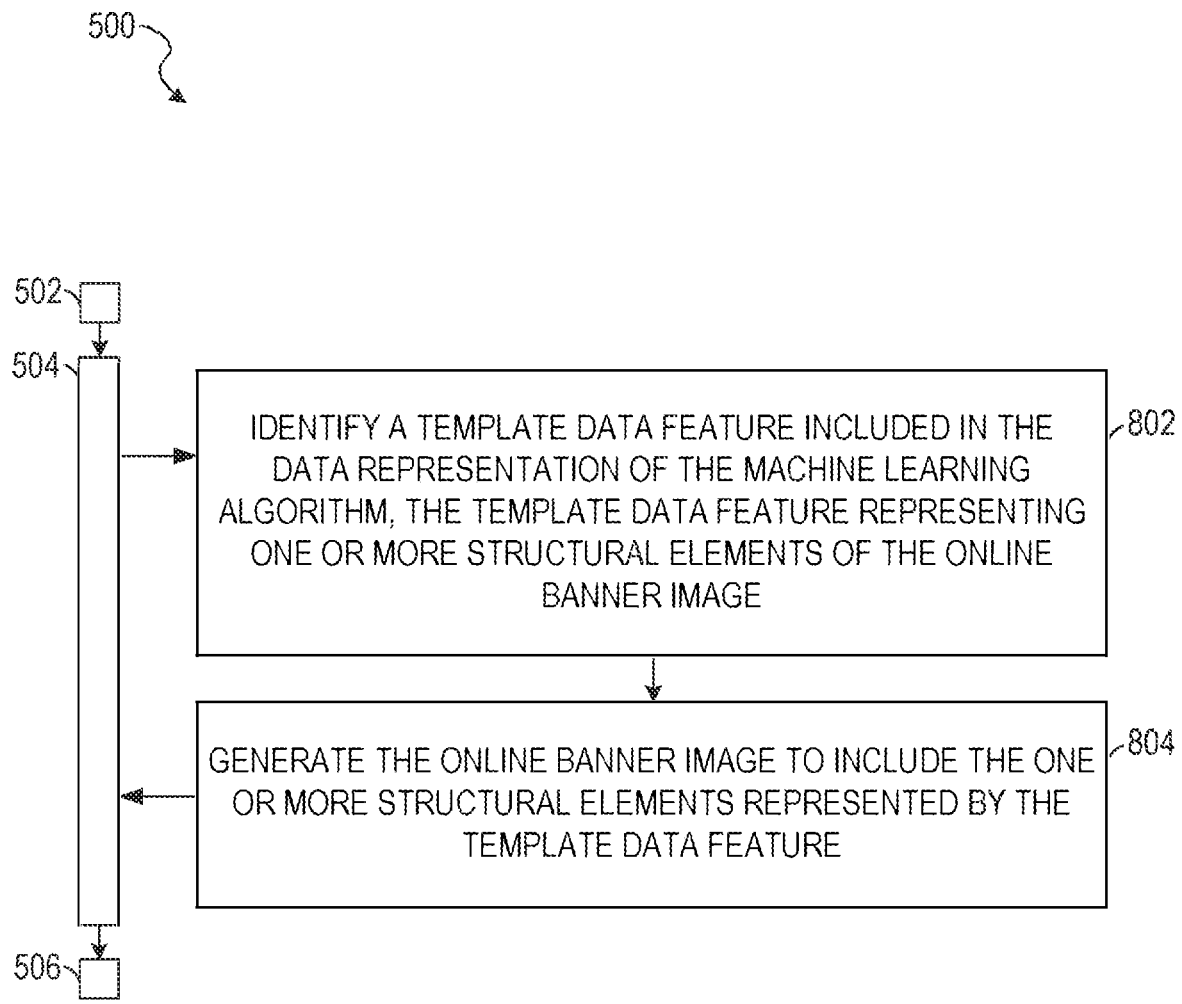
FIG. 8 is a flow diagram illustrating a method for generating personalized banner images using machine learning, and representing step 504 of the method illustrated in FIG. 5 in more detail, according to some example embodiments.

As shown in FIG. 8, method 500 includes operations 802 and 804, according to some embodiments. Operation 802 may be performed as part (e.g., a precursor task, a subroutine, or a portion) of operation 504 of FIG. 5, in which the data representation generating module 404 generates, using a machine learning algorithm, a data representation of the machine learning algorithm.

At operation 802, the data representation generating module 404 identifies a template data feature included in the data representation of the machine learning algorithm. The template data feature represents one or more structural elements of the online banner image. In some instances, the template data feature is associated with identifiers of the one or more structural elements of the online banner image in a record of a database. In some instances, the one or more structural elements of the online banner image are included as data features in the data representation of the machine learning algorithm.

In various example embodiments, the one or more structural elements included in the online banner image comprise at least one background color associated with at least one portion of the online banner image, at least one alphanumeric string that is included in the at least one portion of the online banner image, and at least one product image associated with a product included in an inventory of products available for purchase.

At operation 804, the data representation generating module 404 generates the online banner image to include the one or more structural elements represented by the template data feature.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 9:
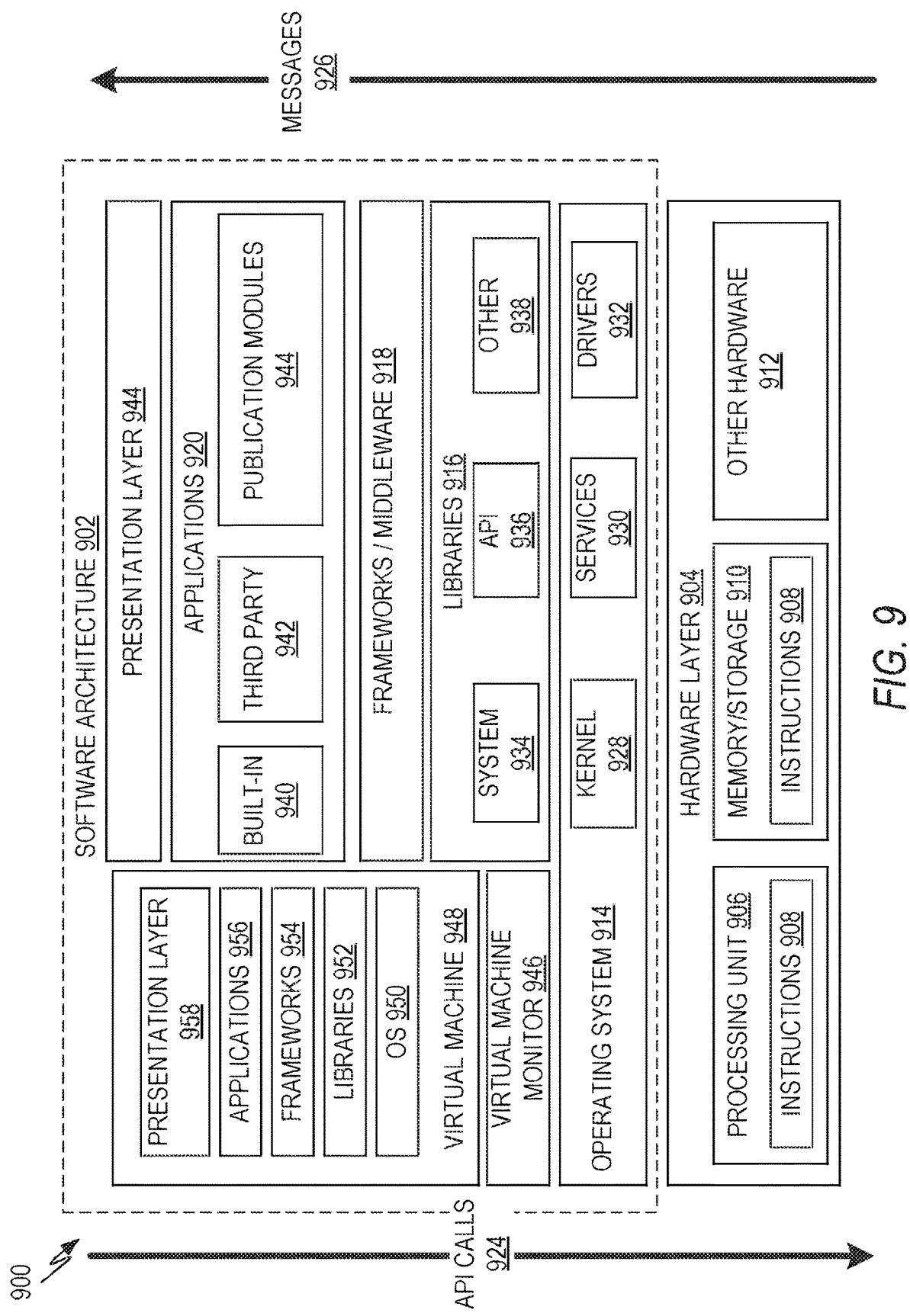
FIG. 9 is a block diagram illustrating an example of a software architecture that may be installed on a machine, according to some example embodiments.
Figure 10:
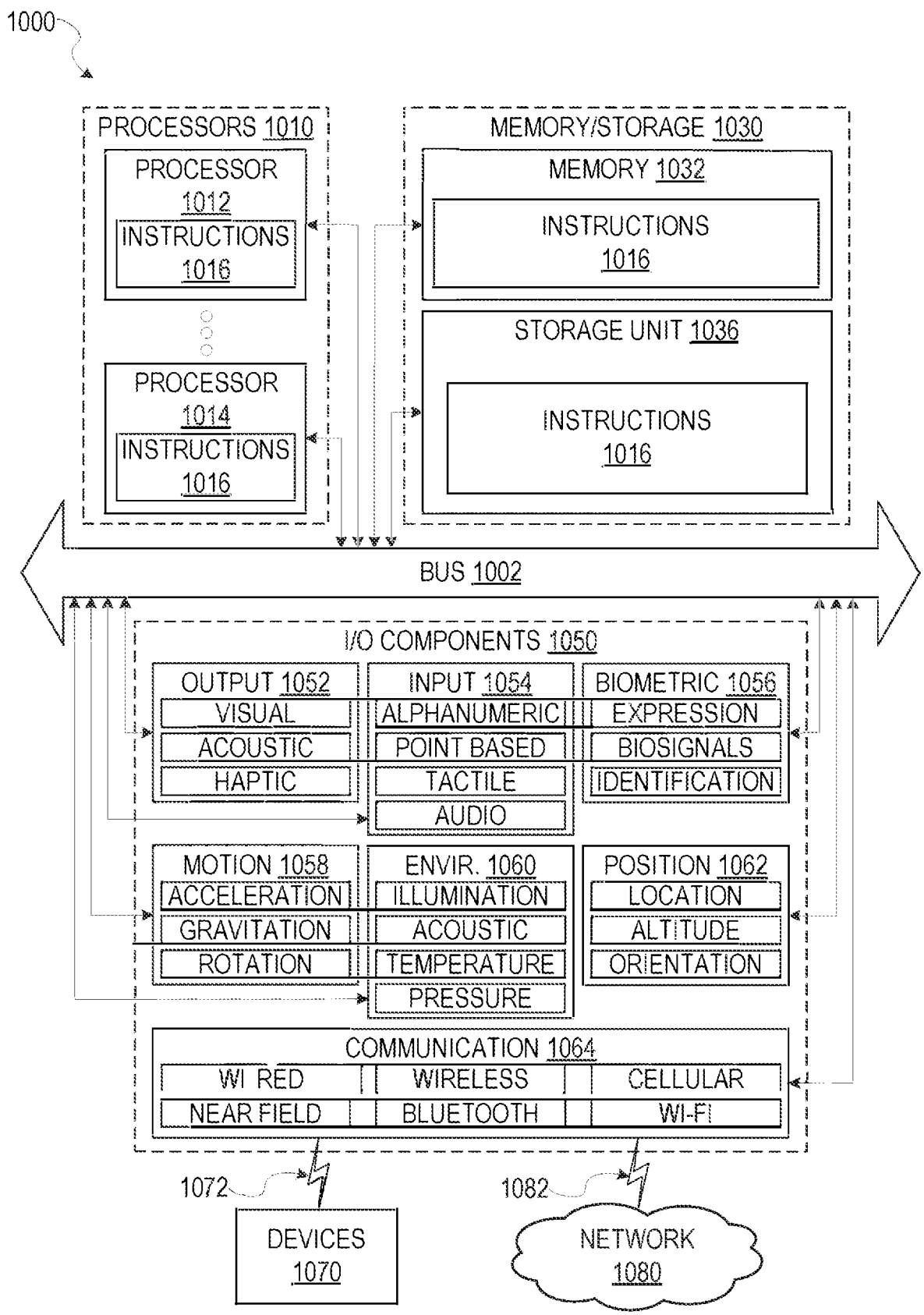
FIG. 10 illustrates a diagrammatic representation of a machine in the form of a computer system within which a set of instructions may be executed for causing the machine to perform any one or more of the methodologies discussed herein, according to an example embodiment.

The modules, methods, applications and so forth described in conjunction with FIGS. 9 and 10 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

FIG. 9 is a block diagram 900 illustrating a representative software architecture 902, which may be used in conjunction with various hardware architectures herein described. FIG. 9 is merely a non-limiting example of a software architecture and it will be appreciated that many other architectures may be implemented to facilitate the functionality described herein. The software architecture 902 may be executing on hardware such as machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. Executable instructions 908 represent the executable instructions of the software architecture 902, including implementation of the methods, modules and so forth of FIGS. 1-8. Hardware layer 904 also includes memory and/or storage modules 910, which also have executable instructions 908. Hardware layer 904 may also comprise other hardware as indicated by 912 which represents any other hardware of the hardware layer 904, such as the other hardware illustrated as part of machine 1000.

In the example architecture of FIG. 9, the software 902 may be conceptualized as a stack of layers where each layer provides particular functionality. For example, the software 902 may include layers such as an operating system 914, libraries 916, frameworks/middleware 918, applications 920 and presentation layer 922. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature, and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as IVPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI)

functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940, third party applications 942, and machine learning modules 944 (e.g., access module 402, data representation generating module 404, banner image generating module 406, or user interface module 408). Examples of representative built-in applications 940 may include, but are not limited to, a contacts application, a browser application, a book reader application, a location application, a media application, a messaging application, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware machine (such as the machine of FIG. 10, for example). A virtual machine is hosted by a host operating system (operating system 914 in FIG. 10) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions may cause the machine to execute the flow diagrams of FIGS. 5-8. Additionally, or alternatively, the instructions may implement the access module 402, the data representation generating module 404, the banner image generating module 406, and the user interface module 408 of FIG. 4. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1.058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The 110 components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fie components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (Wi MAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Executable Instructions and Machine-Storage Medium

The various memories (i.e., 1030, 1032, and/or memory of the processor(s) 1010) and/or storage unit 1036 may store one or more sets of instructions and data structures (e.g., software) 1016 embodying or utilized by any one or more of the methodologies or functions described herein. These instructions, when executed by processor(s) 1010 cause various operations to implement the disclosed embodiments.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more computing devices having one or more processors; and
a machine-readable medium storing instructions that, when executed by the one or more processors, cause the one or more computing devices to perform operations comprising:
monitoring a plurality of user responses to a plurality of online banner images, each online banner image of the plurality of online banner images associated with a different set of structural elements of a plurality of structural elements;
training, based at least in part on a ranking of the plurality of online banner images in accordance with a quantity of user selections of each respective online banner image of the plurality of banner images and based at least partially upon segmenting a user population from the plurality of user responses, a machine learning model to identify a first set of structural elements from the plurality of structural elements, the first set of structural elements associated with a desired user behavior, the desired user behavior selected from clicks on one or more of the plurality of online banner images or a purchase corresponding to one or more of the plurality of online banner images;
generating, using the first set of structural elements, a first online banner image for a listing for a product, the first online banner image including a product image that is selectable to cause display of a product listing; and
causing presentation, by a client device, of the first online banner image.

2. The system of claim 1, wherein the operations to train the machine learning model further comprise:
training the machine learning model to identify the first set of structural elements based at least in part on demographic data, geographic data, profession data, or any combination thereof.

3. The system of claim 1, wherein the desired user behavior includes clicks on one or more of the plurality of online banner images and a purchase corresponding to one or more of the plurality of online banner images.

4. The system of claim 1, wherein the operations to train the machine learning model further comprise:
training the machine learning model to identify the first set of structural elements that are a color, a size, a text font, or any combination thereof, associated with the desired user behavior.

5. The system of claim 1, wherein the causing presentation, by a client device, of the first online banner image is part of an iterative process of presenting banner images.

6. The system of claim 1, wherein the product listing that is selectable to cause information about the product to be displayed.

7. A computer-implemented method comprising:
monitoring, using one or more processors, a plurality of user responses to a plurality of online banner images, each online banner image of the plurality of online banner images associated with a different set of structural elements of a plurality of structural elements;
training, using the one or more processors, based at least in part on a ranking of the plurality of online banner images in accordance with a quantity of user selections of each respective online banner image of the plurality of banner images and based at least partially upon segmenting a user population from the plurality of user responses, a machine learning model to identify a first set of structural elements from the plurality of structural elements, the first set of structural elements associated with a desired user behavior, the desired user behavior being selected from clicks on one or more of the plurality of online banner images or a purchase corresponding to one or more of the plurality of online banner images;
generating, using the first set of structural elements, a first online banner image for a listing for a product, the first online banner image including a product image that is selectable to cause display of a product listing; and
causing presentation, by a client device, of the first online banner image.

8. The computer-implemented method of claim 7, wherein training the machine learning model further comprises:
training the machine learning model to identify the first set of structural elements that are associated with the desired user behavior that is user clicks on one or more of the plurality of online banner images.

9. The computer-implemented method of claim 7, wherein training the machine learning model further comprises:
training the machine learning model to identify the first set of structural elements based at least in part on demographic data, geographic data, profession data, or any combination thereof.

10. The computer-implemented method of claim 7, wherein the desired user behavior includes clicks on one or more of the plurality of online banner images and a purchase corresponding to one or more of the plurality of online banner images.

11. The computer-implemented method of claim 7, wherein training the machine learning model further comprises:
training the machine learning model to identify the first set of structural elements that are a color, a size, a text font, or any combination thereof, associated with the desired user behavior.

12. The computer-implemented method of claim 7, wherein training the machine learning model further comprises:
training the machine learning model to identify the first set of structural elements that indicate a position within an online banner image to place a product that is associated with the desired user behavior.

13. The computer-implemented method of claim 7, wherein the causing presentation, by the client device, of the first online banner image is part of an iterative process of presenting banner images.

14. The computer-implemented method of claim 7, wherein the product listing is selectable to cause information about the product to be displayed.

15. A non-transitory computer-readable medium storing code, the code comprising instructions executable by one or more processors to cause a system to:
monitor, using the one or more processors, a plurality of user responses to a plurality of online banner images, each online banner image of the plurality of online banner images associated with a different set of structural elements of a plurality of structural elements;

train, using the one or more processors, based at least in part on a ranking of the plurality of online banner images in accordance with a quantity of user selections of each respective online banner image of the plurality of banner images and based at least partially upon segmenting a user population from the plurality of user responses, a machine learning model to identify a first set of structural elements from the plurality of structural elements, the first set of structural elements associated with a desired user behavior, the desired user behavior being selected from clicks on one or more of the plurality of online banner images or a purchase corresponding to one or more of the plurality of online banner images;

generate, using the first set of structural elements, a first online banner image for a listing for a product, the first online banner image including a product image that is selectable to cause display of a product listing; and cause presentation, by a client device, of the first online banner image.

16. The non-transitory computer-readable medium of claim 15, wherein the instructions to train the machine learning model are further executable by the one or more processors to cause the system to:

train the machine learning model to identify the first set of structural elements based at least in part on demographic data, geographic data, profession data, or any combination thereof.

17. The non-transitory computer-readable medium of claim 15, wherein the desired user behavior includes clicks on one or more of the plurality of online banner images and a purchase corresponding to one or more of the plurality of online banner images.

18. The non-transitory computer-readable medium of claim 15, wherein the instructions to train the machine learning model are further executable by the one or more processors to cause the system to:

train the machine learning model to identify the first set of structural elements that are a color, a size, a text font, or any combination thereof, associated with the desired user behavior.

19. The non-transitory computer-readable medium of claim 15, wherein the presentation, by a client device, of the first online banner image is part of an iterative process of presenting banner images.

20. The non-transitory computer-readable medium of claim 15, wherein the product listing is selectable to cause information about the product to be displayed.

* * * * *